Feb. 11, 1958 W. T. McCULLOUGH, JR 2,822,766
FUEL BURNING APPARATUS
Filed Jan. 26, 1951 2 Sheets-Sheet 1
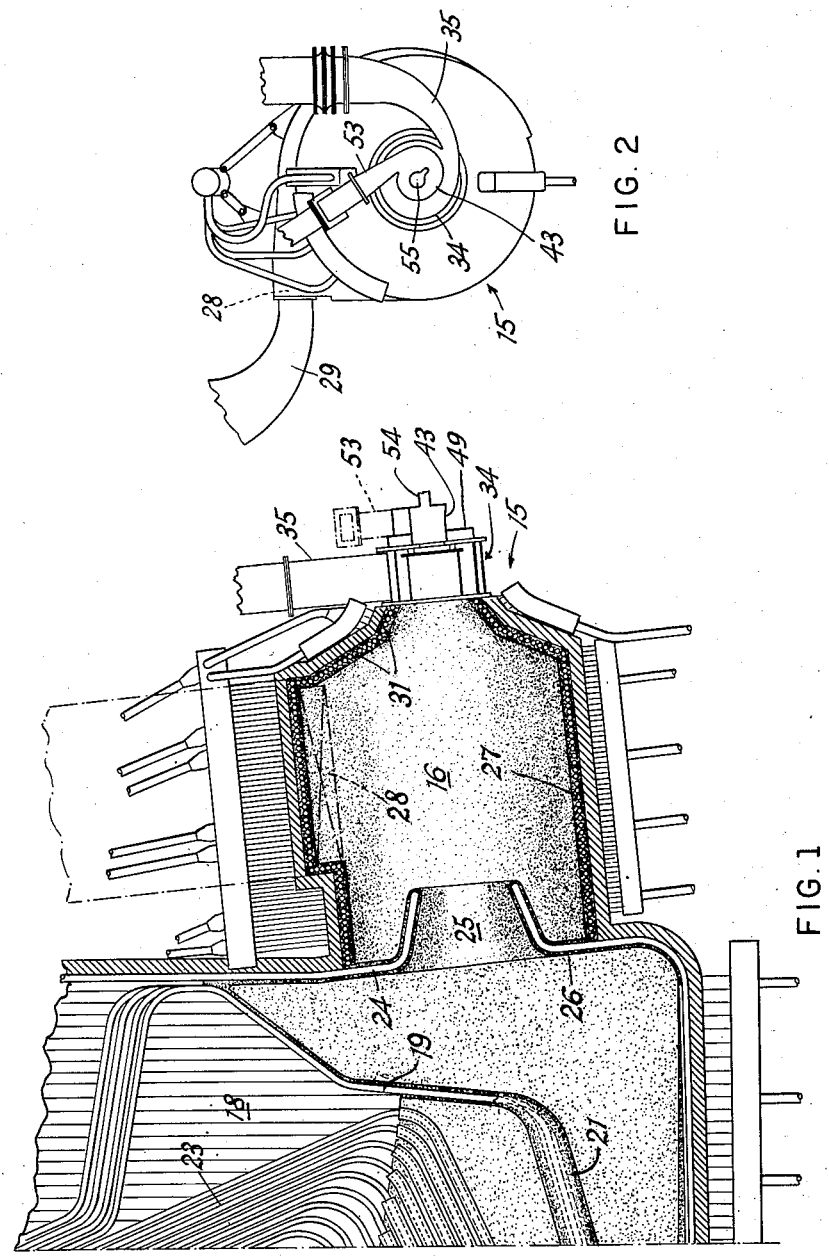
INVENTOR
William T. McCullough, Jr.
BY
ATTORNEY

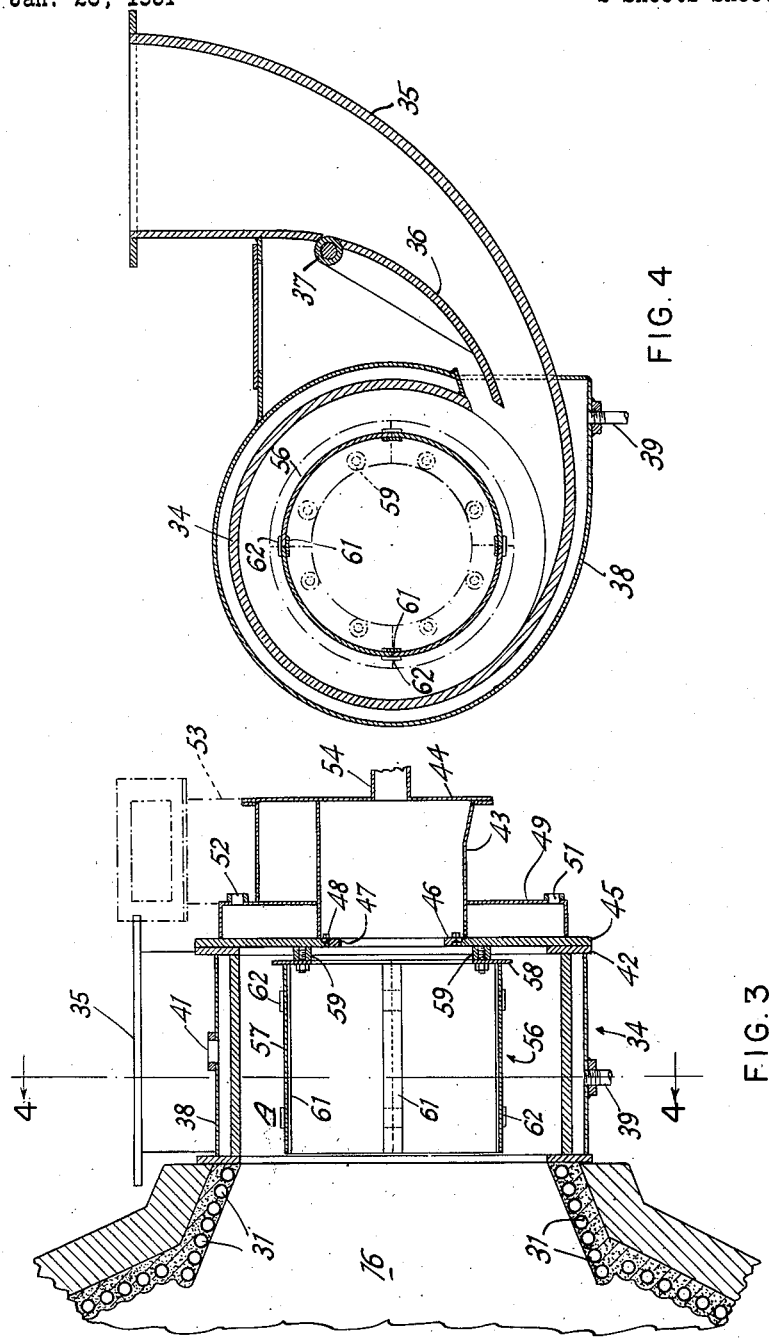

United States Patent Office 2,822,766
Patented Feb. 11, 1958

2,822,766

FUEL BURNING APPARATUS

William T. McCullough, Jr., Scarsdale, N. Y., assignor to The Babcock & Wilcox Company, Rockleigh, N. J., a corporation of New Jersey Application January 26, 1951, Serial No. 207,933

2 Claims. (Cl. 110—28)

The present invention relates in general to the distribution and burning of fuel and more particularly to the construction and operation of apparatus for directing solid fuel fed to a furnace of the cyclone type. Such a furnace is especially adapted to utilize coal of the poorer grades, that is, those having a relatively high content of low fusing temperature ash, the coal being initially crushed or otherwise reduced to a relatively small particle size.

The cyclone furnace involved in the present invention is essentially a horizontally inclined cylinder of water cooled construction into which reduced coal and preheated air are introduced tangentially, so as to maintain a whirling stream of coal and air which is burned at temperatures above the ash fusion temperature. The relatively low fusing temperature of the ash released and the centrifugal effect thereon combine to provide a film or layer of molten ash or slag on the furnace walls, and particularly on the circumferential wall areas. The lighter fuel particles mainly burn in suspension, while the heavier particles are thrown outwardly and caught on the slag layer. A vigorous scrubbing action takes place between the air and entrapped coal particles, resulting in extremely rapid and complete combustion. The slag layer rapidly reaches an equilibrium thickness and, as additional ash is deposited, the excess slag drains to a slag discharge opening adjacent the gas discharge end of the furnace.

The cyclone furnace is particularly adapted for use as the firing means for a vapor generating unit through which gases from the cyclone furnace are directed, and from which the gases are finally discharged, suitably under induced draft, the air for combustion being supplied to the furnace under forced draft. The unit may also be operated with only a forced draft fan in use under which condition all of the combustion air is supplied to the cyclone furnace at a high positive pressure of the order of about 40 in. $H_2O$, and a decreasing positive pressure maintained throughout the remainder of the installation. In either case the power requirement for operating one or both fans is considerable. One of the objects therefore of the present invention is to reduce the fan power requirement by suitably directing the flow of incoming fuel and air within the cyclone furnace as hereinafter described.

The various features of novelty that characterize my invention are pointed out with particularly in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Of the drawings:

Fig. 1 is a side elevation, in section, of a cyclone furnace installation including an embodiment of my invention;

Fig. 2 is an end view of the furnace shown in Fig. 1;

Fig. 3 is a fragmentary enlargement of the furnace illustrated in Fig. 1; and

Fig. 4 is a cross sectional view of Fig. 3 taken along line 4—4.

As illustrated herein, a cyclone furnace 15 is formed as an integral component of a vapor generating unit of an arrangement more fully disclosed in the copending application of H. J. Kerr et al., Serial No. 552,120, filed August 31, 1944, now Patent No. 2,594,312, wherein the cyclone type primary furnace chamber 16, of substantially circular cross section about a horizontally inclined longitudinal axis, is preferably fired by a crushed or granular fuel, such as bituminous or semi-bituminous coal, which is delivered thereto with a supply of preheated primary or carrier air. The products of combustion from the primary furnace chamber 16 flow into a secondary furnace chamber 18 in which vapor generating tubes form a reflecting arch 19, a slag screen 21, and vertical tube platens 23, with which the products of combustion successively contact. Other vapor generating tubes extend along an upright wall 24 which separates the furnace chambers 15 and 16 and which is formed with a re-entrant throat 25 through which the gaseous products of combustion are discharged from the primary chamber 16 into the secondary chamber 18. An opening is formed between tubes in wall 24, at a location 26 below throat 25, to permit molten slag to drain into the secondary furnace.

The cylindrical boundary wall of chamber 16 is formed by closely spaced tubes 27 which conform to the contour of the wall and which are suitably connected for natural circulation of fluid therethrough. Certain of the tubes 27 are disposed along an involute curve so as to define a rectangular tangentially directed air inlet port 28 for the admission of secondary air, as delivered thereto through a transversely tapering curved inlet duct 29 which, in accordance with the prior disclosure, is partitioned at its lower end into longitudinally successive sections, and each section provided with a separate damper means for regulating the supply and distribution of secondary air. The outer end wall portion of chamber 16 is tapered outwardly in cross section and formed by tubes 31 which are suitably connected for natural circulation of fluid therethrough, in parallel with the circulation through tubes 27 and through other tubes of the unit including, for example, the tubes associated with the common dividing wall 24 between chambers 16 and 18, as more fully disclosed in the aforesaid application.

A fuel inlet chamber or primary coal burner 34 of substantially circular internal cross section, of smaller diameter than the main cyclone chamber 16, is arranged at the forward end of chamber 16 in axially communicating relationship therewith. The fuel, in crushed or granulated form, together with preheated primary air under a relatively high positive pressure, is directed into a lower part of burner 34 through an involute curved primary air-coal pipe 35. The effective flow area and thereby the velocity of the fuel-air stream is controlled by a manually operated control damper 36 hinged at 37 along the upper side of pipe 35, as indicated in Fig. 4. The primary burner 34 is provided at its outer periphery with a cooling jacket 38 having a water inlet 39 at the bottom and a water outlet 41 at the top.

The primary burner 34 terminates in an outer end flange 42 to which is assembled a tertiary air scroll chamber 43 in axial alignment with burner 34, the chamber 43 having a companionate end flange or plate 45, suitably secured to flange 42 and forming the outer end wall of burner 34, the plate 45 being formed with a separable annular plate section 46 which provides a central opening or flow-restricting orifice 47 arranged co-axially of the primary burner 34. The inner and outer sections of flange 45 are formed with a rabbeted joint therebetween so as to provide overlapping marginal areas which are held in assembled relation by bolts 48. A water jacket 49 having water inlet and outlet connections 51 and 52, respectively, is formed adjacent the outer side of end plate 45. Preheated air is supplied to chamber 43 by a duct 53 controlled by suitable damper means not shown. The duct 53, as seen in Fig. 2, has an involute curved connection to the chamber 43, producing a whirling stream of tertiary air which is directed axially of primary burner 44 by the orifice plate 46. The axial tubular extension 54 may be suitably formed to provide a seat for an inspection door 55, through which operation of the furnace may be observed; or, in starting up, an oil burner may be inserted to initially heat the primary furnace and ignite the coal when it is introduced.

As a means for improving operation of the furnace unit, a filler sleeve, or cylindrical deflector 56, is arranged within the primary burner 34 so as to confine the swirling mixture of primary air and coal to an annulus, or annular zone A, directly adjacent the inner peripheral wall of the chamber. The sleeve 56 is formed with a main cylindrical portion 57 arranged concentrically with respect to the longitudinal central axis of chamber 34 and extending substantially throughout the total lenth thereof, and thus in coextensive relation to the full-air inlet pipe 35. Due to the coaxial relationship of cylindrically formed outer and inner walls 34 and 57, the annular zone A is open throughout its major transverse cross section directly to the combustion chamber 16. An annular flange or end plate 58 is secured to part 57 at the outer end thereof by which the sleeve is supported on end plate 45 of the tertiary air chamber, the sleeve 56 being maintained in spaced relation to plate 45 by means of pads 59 which are welded to plate 45. The pads 59 are internally threaded to receive studs, as shown, which extend through circumferentially spaced holes in flanges 58, and to which nuts are secured at the inner side of the flange to complete the assembly.

In order to provide for convenient removal and replacement of sleeve 56, from and into operative position within the primary burner chamber 34, the sleeve assembly, including the end plate 58, is circumferentially divided into a number of segments, each of small enough overall dimension to permit individual passage thereof through the front of the tertiary air scroll chamber 43. For such a purpose, the front wall 44 is removed, and also the annular orifice plate section 46. As indicated in Fig. 4, the cylindrical deflector 56 is divided into four equal segments, and the joints between segments are overlapped at the inside and outside by bars 61 and 62 respectively. Each inner bar 61 extends substantially throughout the length of the joint between segments and is welded along a longitudinal edge to one segment. The outer bars 62 are longitudinally spaced in pairs across each joint, and each is similarly welded along one edge to one of the adjoining segments.

In the installation disclosed, the crushed or otherwise reduced coal is introduced into the primary burner 34 with a tangentially directed stream of primary air which imparts a whirling motion to the fuel particles and discharges them into the larger adjacent cyclone chamber 16. The whirling or centrifugal effect is increased by the tangential admission of preheated high velocity secondary combustion air through the air inlet duct 29, the direction of whirl of both streams being the same. The combustion proceeds within the cyclone furnace with the final discharge of combustion gases through the re-entrant throat 25 at the opposite end of chamber 16. The tertiary air from chamber 43 is directed axially of the furnace interiorly of the filler sleeve 56 and, without appreciable reduction in either axial or peripheral velocity, enters the larger diameter cyclone chamber 16 interiorly of the rapidly whirling body of fuel and air therein and thereby provides a stream of auxiliary air for burning fine coal particles that are not thrown to the periphery of the chamber, and which otherwise might be carried in suspension by gases discharging from the unit. A portion of the tertiary air enters the space between the end plates 45 and 58 and thus assists in the cooling of an outer wall of the primary air chamber 34. Additionally, as previously mentioned, the provision of the cylindrical deflector 56 interiorly of chamber 34, in confining the incoming fuel and primary air to an annular zone directly adjacent the outer wall, results in an appreciable reduction in the primary air pressure required and thus contributes to an advantageous reduction in fan power requirements.

While in accordance with the provision of the statutes I have illustrated and described herein the best form of my invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. In a cyclone furnace having a circumferential wall defining a combustion chamber of substantially circular cross-section, an end wall portion having a fuel and air inlet opening therein, port means in said circumferential wall for introducing secondary combustion air under superatmospheric pressure conditions substantially tangentially into the circular cross-section portion of said combustion chamber, a fuel and primary air inlet chamber of substantially circular cross-section concentric with said combustion chamber and having an outlet at one end registering with said fuel and air inlet opening, a filler member of circular cross-section radially inwardly spaced from the circumferential wall of said inlet chamber and defining with said wall a circumferentially continuous annular space opening at one end directly to said fuel and air inlet opening, means for tangentially introducing a stream of primary air and slag-forming particle fuel under superatmospheric pressure conditions into the annular space of said fuel inlet chamber at a high angular velocity for movement through said outlet into said combustion chamber, and means for passing a whirling stream of tertiary air under superatmospheric pressure conditions through the interior of said filler member axially of the whirling stream of primary air and slag-forming particle fuel entering said combustion chamber.

2. In a cyclone furnace having a circumferential wall defining a combustion chamber of substantially circular cross-section about a central axis, port means in said circumferential wall for introducing secondary combustion air under superatmospheric pressure conditions substantially tangentially into said combustion chamber, a fuel and primary air inlet chamber of substantially circular cross-section concentric with said combustion chamber and having an outlet at one end registering with and opening into one end of said combustion chamber, a filler sleeve of circular cross-section radially inwardly spaced from the circumferential wall of said inlet chamber and defining with said wall a circumferentially continuous annular space opening at one end throughout its total circumference and major transverse cross-section directly to said outlet, an air supply chamber arranged adjacent said fuel and air inlet chamber and opening into the outer end of said inlet chamber at a location inwardly of the periphery of said sleeve, and means for introducing a stream of primary air and a slag-forming particle fuel under superatmospheric pressure conditions in suspension tangentially into the annular space of said fuel inlet chamber at a high angular velocity for movement through said outlet into said combustion chamber, said filler sleeve being confined to the axial limits of said inlet chamber, and a tangential inlet for introducing a whirling stream of tertiary air into said air under superatmospheric pressure conditions supply chamber for discharge into said cyclone chamber inwardly of said whirling stream of primary air and slag-forming particle fuel entering said combustion chamber.

References Cited in the file of this patent

UNITED STATES PATENTS

| | | |
|---|---|---|
| 1,852,531 | Krutzberg | Apr. 5, 1932 |
| 1,860,987 | Braine et al. | May 31, 1932 |
| 1,950,980 | Frisch | Mar. 13, 1934 |
| 2,039,890 | De Coster | May 5, 1936 |
| 2,041,535 | Frisch | May 19, 1936 |
| 2,097,214 | Peterson | Oct. 26, 1937 |
| 2,325,318 | Hendrix | July 27, 1943 |
| 2,357,301 | Bailey et al. | Sept. 5, 1944 |

FOREIGN PATENTS

| | | |
|---|---|---|
| 289,930 | Great Britain | Apr. 30, 1928 |
| 305,437 | Great Britain | Feb. 7, 1929 |
| 466,831 | Germany | Oct. 12, 1928 |
| 629,909 | Germany | May 18, 1936 |
| 136,320 | Switzerland | Jan. 2, 1930 |